United States Patent
Zhang et al.

(10) Patent No.: US 10,068,574 B2
(45) Date of Patent: Sep. 4, 2018

(54) VOICE CONTROL METHOD, DEVICE AND TERMINAL

(71) Applicant: Hisense Co., Ltd., Qingdao (CN)

(72) Inventors: Dazhao Zhang, Qingdao (CN); Baolei Cui, Qingdao (CN); Wenfei Zhu, Qingdao (CN)

(73) Assignees: HISENSE CO., LTD., Qingdao (CN); HISENSE USA CORPORATION, Suwanee, GA (US); HISENSE INTERNATIONAL CO., LTD., Qingdao (CN)

( * ) Notice: Subject to any disclaimer, the term of this patent is extended or adjusted under 35 U.S.C. 154(b) by 10 days.

(21) Appl. No.: 15/393,546

(22) Filed: Dec. 29, 2016

(65) Prior Publication Data

US 2017/0110128 A1    Apr. 20, 2017

(30) Foreign Application Priority Data

Apr. 28, 2016   (CN) .......................... 2016 1 0271400

(51) Int. Cl.
| | |
|---|---|
| G10L 15/22 | (2006.01) |
| G10L 15/18 | (2013.01) |
| G10L 25/51 | (2013.01) |
| G06F 3/16 | (2006.01) |

(52) U.S. Cl.
CPC .......... *G10L 15/22* (2013.01); *G10L 15/1815* (2013.01); *G10L 25/51* (2013.01); *G06F 3/167* (2013.01); *G10L 15/1822* (2013.01); *G10L 2015/223* (2013.01)

(58) Field of Classification Search
USPC ........................................................ 704/275
See application file for complete search history.

(56) References Cited

U.S. PATENT DOCUMENTS

| | | | | |
|---|---|---|---|---|
| 5,729,659 | A * | 3/1998 | Potter | G10L 15/193 704/257 |
| 5,774,859 | A * | 6/1998 | Houser | H04N 5/44543 348/E5.103 |
| 5,884,266 | A * | 3/1999 | Dvorak | H04M 3/493 704/260 |
| 5,890,123 | A * | 3/1999 | Brown | G06F 3/16 704/235 |
| 6,249,764 | B1 * | 6/2001 | Kamae | G06F 17/30014 704/270.1 |
| 6,654,721 | B2 * | 11/2003 | Handelman | H04N 7/163 348/E7.061 |

(Continued)

*Primary Examiner* — Abul Azad
(74) *Attorney, Agent, or Firm* — Harness, Dickey & Pierce, P.L.C.

(57) ABSTRACT

Disclosed are a voice control method, device and terminal, and the method includes: after a terminal has been triggered into voice control mode, receiving input voice data and obtaining corresponding speech text according to the voice data; matching the speech text with an interface word list corresponding to a current operating interface, wherein the interface word list includes text information of the current operating interface; in response to determining that the speech text matches an interface word list successfully, obtaining in the current operating interface an operation link which corresponds to the speech text; and performing an operation corresponding to the operation link.

13 Claims, 4 Drawing Sheets

(56) References Cited

U.S. PATENT DOCUMENTS

| | | | | |
|---|---|---|---|---|
| 6,762,692 B1 * | 7/2004 | Mingot | ............... | G10L 15/22 340/12.54 |
| 7,593,845 B2 * | 9/2009 | Ramsey | ............ | G06F 17/2715 704/200 |
| 8,938,394 B1 * | 1/2015 | Faaborg | ............... | G06F 3/167 704/270 |
| 2013/0124207 A1 * | 5/2013 | Sarin | ............... | G10L 15/22 704/275 |
| 2015/0206529 A1 * | 7/2015 | Kwon | ............... | G10L 17/22 704/246 |

* cited by examiner

VOICE CONTROL METHOD, DEVICE AND TERMINAL

CROSS-REFERENCE TO RELATED APPLICATION

This application claims the benefit and priority of Chinese Patent Application No. 201610271400.5 filed Apr. 28, 2016. The entire disclosure of the above application is incorporated herein by reference.

FIELD

The present disclosure relates to the field of voice control, and particularly to a voice control method, device and terminal.

BACKGROUND

This section provides background information related to the present disclosure which is not necessarily prior art.

With rapid developments of technologies in recent years, speech recognition and control technology has been applied to various terminals. A user may command a terminal with his/her voice through a speech recognition device in the terminal, which has brought innovation to control technologies of terminals. So far, voice control has become a mainstream control method of terminals.

Take smart TV as an example. Usually, a voice application program such as a voice assistant is installed in a smart TV, a user enters a voice input through the voice assistant, then the smart TV comprehends the semantic meaning of the voice input and locates a service accordingly, so as to realize voice control of the smart TV.

SUMMARY

This section provides a general summary of the disclosure, and is not a comprehensive disclosure of its full scope or all of its features.

Embodiments of the disclosure provide a voice control method, device and terminal.

Specific technical solutions provided by the disclosure are as following:

In an aspect, embodiments of the disclosure provides a voice control method, including:

after a terminal has been triggered into a voice control mode, receiving input voice data and obtaining corresponding speech text according to the voice data;

matching the speech text with an interface word list corresponding to a current operating interface, where the interface word list includes text information of the current operating interface;

in response to determining that the speech text matches the interface word list successfully, obtaining in the current operating interface an operation link which corresponds to the speech text; and performing an operation corresponding to the operation link.

In another aspect, embodiments of the disclosure provide a voice control device, including:

at least one processor; and a memory communicatively connected with the at least one processor, where:

the memory stores therein instructions executable by the at least one processor, where the instructions are executed by the at least one processor to enable the at least one processor to perform:

after a terminal has been triggered into voice control mode, receiving input voice data and obtaining corresponding speech text according to the voice data;

matching the speech text with an interface word list corresponding to current operating interface, where the interface word list includes text information of the current operating interface;

in response to determining that the speech text matches the interface word list successfully, obtaining in the current operating interface an operation link which corresponds to the speech text; and performing an operation corresponding to the operation link.

In another aspect, embodiments of the disclosure provide a terminal which includes the voice control device described above.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts or features throughout the several views of the drawings.

DETAILED DESCRIPTION

Example embodiments will now be described more fully with reference to the accompanying drawings.

Embodiments of the disclosure provide a voice control method, which is applicable to a terminal with an operating interface, e.g., the voice control method provided by embodiments of the disclosure could be applied to voice control of a smart TV, a smart phone, a tablet PC or a laptop. It should be noted that, the descriptions of the embodiments of the disclosure will take a smart TV as an example, which doesn't mean the disclosure is limited to a smart TV.

The voice control method provided by embodiments of the disclosure, matches speech text input by a user with an interface word list corresponding to current operating interface, if the match is successful, obtains an operation link corresponding to the speech text in the current operating interface, and performs corresponding operation(s) according to the operation link to realize the user's voice control of the terminal. The voice control method provided by embodiments of the disclosure doesn't require semantic comprehension of the speech text input by the user, thereby simplifying voice control process of the terminal, increasing voice control response rate and accuracy of the terminal, and thus improving user experience of the terminal.

Figure 1:
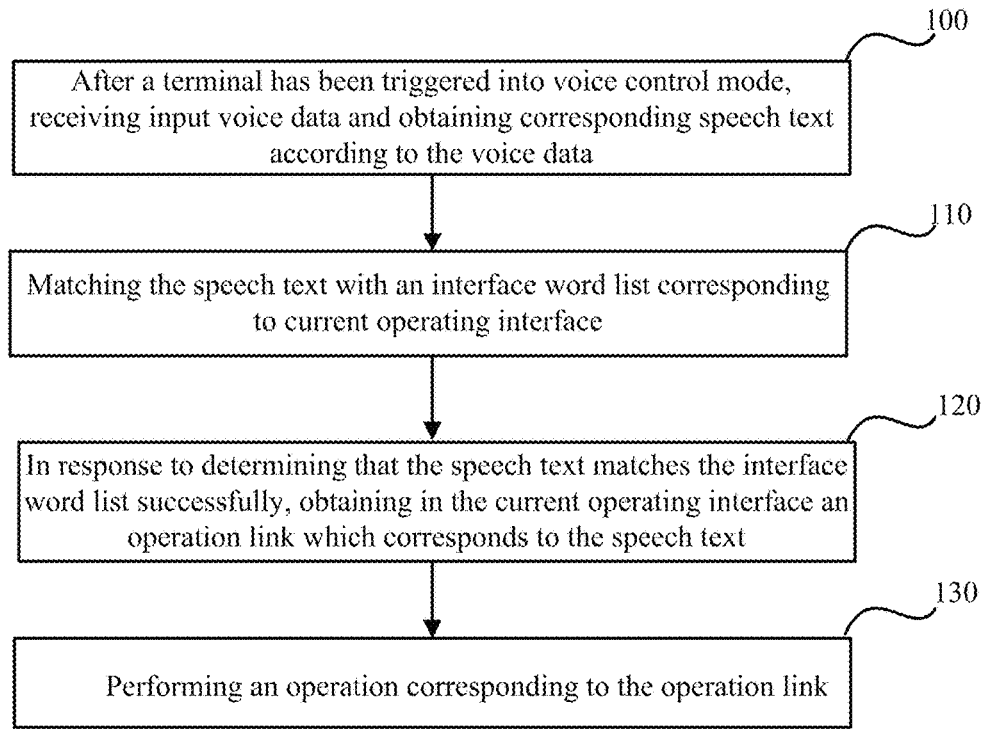
FIG. 1 is a schematic flow chart of a voice control method according to some embodiments of the disclosure.

FIG. 1 illustrates a schematic flow chart of a voice control method according to embodiments of the disclosure. As illustrated in FIG. 1, the method includes:

Operation 100: after a terminal has been triggered into voice control mode, receiving input voice data.

In at least one embodiment of the disclosure, a user may use a remote control to trigger the terminal into voice control mode, or use a push button on the terminal to trigger the terminal into voice control mode. As an example, a user pushes voice control button on a remote control to trigger a smart TV into voice control mode and a voice input module starts to monitor voice data input by the user in real time. As an example, the voice input module has a voice recording function, which is realized by a microphone on the smart TV or a remote control corresponding to the smart TV.

In at least one embodiment, after the terminal has entered into voice control mode, when the user is inputting voice data, the terminal could use the voice input module to receive voice data input by the user and recognize the voice data input by the user to obtain its corresponding speech text. For example, when the user inputs voice data such as "play American Dreams in China", "watch Bride Wars", "watch", "Let's Get Married", and "Yawen Zhu", the terminal could use the voice input module to receive above voice data input by the user, and thus recognizing the above voice data to get the corresponding speech text: "play American Dreams in China", "watch Bride Wars", "watch", "Let's Get Married", and "Yawen Zhu". Of course in a practical application, the user could input any voice data, the terminal could use the voice input module to receive any voice data input by the user, recognize the voice data and obtain its corresponding voice data text.

Figure 2:
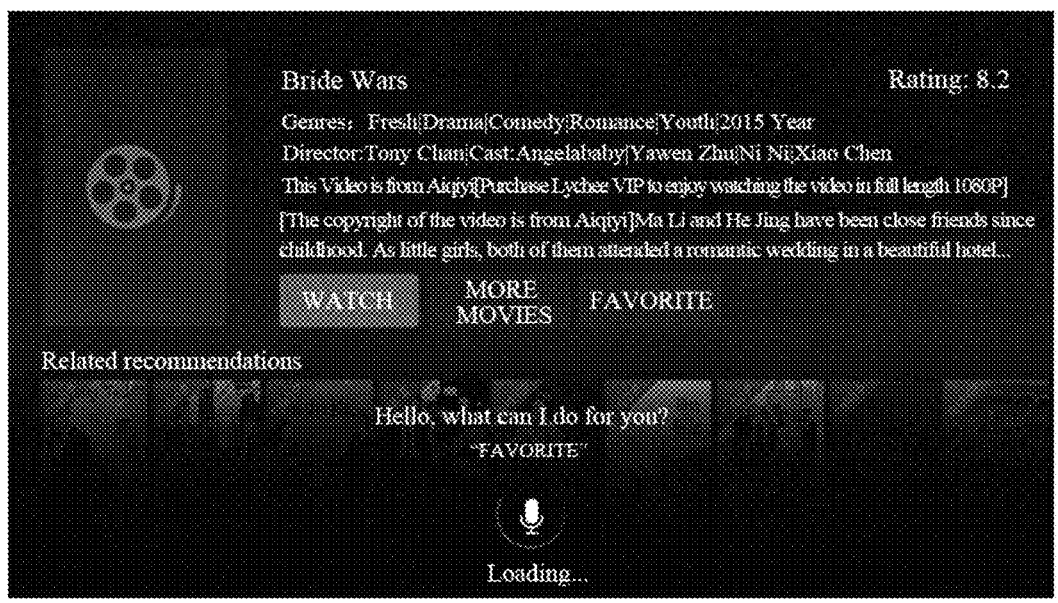
FIG. 2 is a schematic diagram of the input speech text displaying on current operating interface according to some embodiments of the disclosure.

In at least one embodiment, in the Operation 100, the terminal could display on current interface the speech text corresponding to the voice data received by the voice input module, for example, the terminal displays on the current interface the speech text "play American Dreams in China", "watch Bride Wars", "watch", "Let's Get Married", and "Yawen Zhu". As an example, as illustrated in FIG. 2, "Favorite" is displayed on the current video screen of the smart TV.

Operation 110: matching the speech text with an interface word list corresponding to the current operating interface.

Figure 3:
FIG. 3 is a schematic diagram of a current operating interface according to embodiments of the disclosure.

After having received the voice data input by the user, recognized it and obtained its corresponding speech text, the terminal obtains the interface word list corresponding to the current operating interface, where the interface word list corresponding to the current operating interface includes all the text information on the current operating interface. For example, FIG. 3 illustrates the current operating interface, and the interface word list corresponding to the current operating system includes: Bride Wars, Rating, 8.2, Genres, Fresh, Drama, Comedy, Romance, Youth, 2015, Director, Tony Chan, Cast, Angelababy, Yawen Zhu, Ni Ni, Xiao Chen, This Video is from Aiqiyi, Purchase Lychee VIP to enjoy watching the video in full length 1080P, The copyright of the video is from Aiqiyi, Ma Li and He Jing have been close friends since childhood and as little girls both of them attended a romantic wedding in a beautiful hotel and since then they have been dreaming about holding their own wedding ceremonies in the same hotel, WATCH, MORE MOVIES, FAVORITE, Let's Get Married, American Dreams in China, Only You, The Longest Night in Shanghai, of the Beautiful President (or Personal Bodyguard of the Beautiful President), Women Who Know How to Flirt are the (or Women Who Know How to Flirt Are the Luckiest), Whoever, Fight against Landlords, Valentine's Day Fate (Valentine's Day Fate Creation). It should be noted that every phrase separated by a comma in the interface word list corresponding to the operating interface in FIG. 3 is an independent character string of the interface word list. Of course, the description herein is just an example, to which in practice an interface word list corresponding to a current operating interface is not limited.

As an example, the terminal could obtain the textual phrases displayed on the current operating interface by using its background services. Because textual phrases displayed on the terminal are loaded by different widgets, textual phrases displayed on the terminal are character strings classified according to their widgets, i.e. a widget corresponds to a character string and an operating link the character string corresponds to. After having obtained the textual phrases displayed on the current operating interface, the terminal generates the interface word list corresponding to the current operating interface according to the textual phrases.

In at least one embodiment the terminal matches the interface word list corresponding to the current operating interface with the speech text corresponding to the voice data input by the user. The way of match could be comparing the character string corresponding to the speech text input by the user with the character strings in the interface word list corresponding to the operating interface, where if there is a character string, which is as same as the character string corresponding to the voice data input by the user, in the interface word list corresponding to the current operating interface, then it is determined that the match is successful, otherwise the match fails. Of course, those skilled in the art could use other match methods according to practical needs, which embodiments of the disclosure don't limit.

As an example, the speech text corresponding to the voice data input by the user is "American Dreams in China", the terminal compares the character string "American Dreams in China" as a whole with character strings in the interface word list corresponding to the operating interface in FIG. 3, and finds that there is a character string completely the same as "American Dreams in China" corresponding to the voice data input by the user, in the interface word list corresponding to the operating interface in FIG. 3, then it is determined that the match is successful.

As an example, the speech text corresponding to the voice data input by the user is "watch", the terminal compares the character string "watch" as a whole with character strings in the interface word list corresponding to the operating interface in FIG. 3, and finds that there is a character string completely the same as "watch" corresponding to the voice data input by the user, in the interface word list corresponding to the operating interface in FIG. 3, then it is determined that the match is successful.

As an example, the speech text corresponding to the voice data input by the user is "watch American Dreams in China", the terminal compares the character string "watch American Dreams in China" as a whole with character strings in the interface word list corresponding to the operating interface in FIG. 3, and finds that there are character strings "watch" and "American Dreams in China" in the interface word list corresponding to the operating interface in FIG. 3, but no the character string "watch American Dreams in China", then it is determined that the match fails.

Operation 120: in response to determining that the speech text matches the interface word list successfully, obtaining in the current operating interface an operation link corresponding to the speech text.

Figure 4:
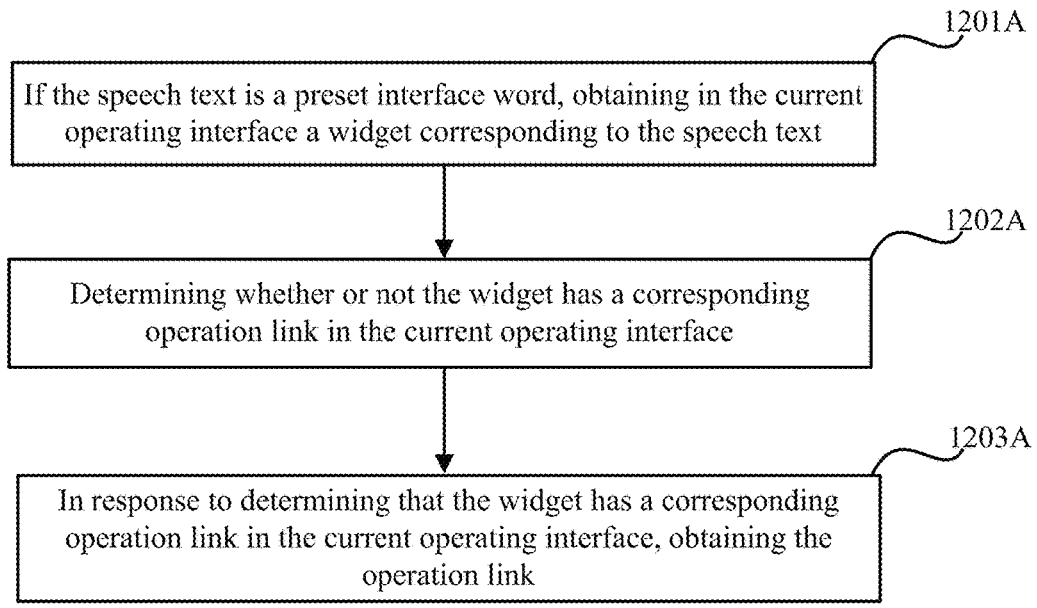
FIG. 4 is a schematic execution flow chart of Operation 120 according to embodiments of the disclosure.

In one aspect, in response to determining that the speech text corresponding to the voice data input by the user matches the interface word list corresponding to the current operating interface successfully, the terminal could use the method below to obtain in the current operating interface an operation link corresponding to the speech text input by the user, as illustrated in FIG. 4.

Operation 1201A: if the speech text is a preset interface word, obtaining in the current operating interface a widget corresponding to the speech text.

Operation 1202A: determining whether or not the widget has a corresponding operation link in the current operating interface.

Operation 1203A: in response to determining that the widget has a corresponding operation link in the current operating interface, obtaining the operation link.

In at least one embodiment, in a case that the speech text corresponding to the voice data input by the user matches the interface word list corresponding to the current operating interface successfully, the corresponding operation widget in the current interface which is corresponding to the speech text corresponding to the voice data input by the user is further determined. For example, the speech text corresponding to the voice data input by the user is "American Dreams in China", which matches successfully with the character string "American Dreams in China" in the interface word list corresponding to the operating interface in FIG. 3, then the operation widget in the current operating interface which corresponds to the speech text "American Dreams in China" corresponding to the voice data input by the user is a loading widget of a webpage introducing the details of the movie "American Dreams in China".

In at least one embodiment, after having obtained in the current interface the operation widget corresponding to the speech text which corresponds to the voice data input by the user, determine whether or not the operation widget has a corresponding operation link in the current operating interface. If there is a corresponding operation link in the current operating interface for the operation widget, obtain the operation link corresponding to the operation widget, and if there is no corresponding operation link in the current operating interface for the operation widget, comprehend the semantic meaning of the speech text corresponding to the voice data input by the user.

It should be noted that, determining in the current operation interface an operation widget corresponding to the speech text which corresponds to a voice data input by the user could be implemented by a background program in the terminal, since textual phrases displayed on the terminal are character strings classified according to their widgets, i.e. a widget corresponds to a character string and an operation link corresponding to the widget, the operation widget in the current interface which corresponds to the speech text corresponding to the voice data input by the user and the operation link corresponding to the operation widget could be determined according to an textual phrase displayed on the terminal. For example, the operation link in the operating interface illustrated by FIG. 3 which corresponds to the character string "watch" is a playing widget which plays the movie "Bride Wars", and its corresponding operation link is to play the movie "Bride Wars", which means, if the operation widget corresponding to the character string "watch" is clicked, the operating interface of the terminal would play the movie "Bride Wars".

The operation process of Operation 1201A, Operation 1202A and Operation 1203A would be described with specific examples below.

For example, in a case that the speech text "American Dreams in China" corresponding to the voice data input by the user matches successfully with the character string "American Dreams in China" in the interface word list corresponding to the operating interface of FIG. 3, then the terminal obtains a loading widget of a webpage which introduces the movie "American Dreams in China" in detail as the operation widget in the current operating interface which corresponds to the character string "American Dreams in China", and then determines that in the current operating interface there is an operation link corresponding to the operation widget corresponding to the character string "American Dreams in China", and the operation link is to display the webpage which introduces the movie "American Dreams in China" in detail, i.e. the operation link in the current operating interface corresponding to the character string "American Dreams in China" is to display the webpage which introduces the movie "American Dreams in China" in detail.

For example, in a case that the speech text "watch" corresponding to the voice data input by the user matches successfully with the character string "watch" in the interface word list corresponding to the operating interface of FIG. 3, then the terminal obtains a playing widget which plays the movie "Bride Wars" as the operation widget in the current operating interface which corresponds to the character string "watch", and then determines that there is an operation link in the current operating interface corresponding to the operation widget corresponding to the character string "watch", and the operation link is a playing link of the movie "Bride Wars", i.e. the operation link in the current operating interface corresponding to the character string "watch" is to play the movie "Bride Wars".

For example, in a case that the speech text "Tony Chan" corresponding to the voice data input by the user matches successfully with the character string "Tony Chan" in the interface word list corresponding to the operating interface of FIG. 3, then the terminal obtains a director's name displaying widget as the operation widget in the current operating interface which corresponds to the character string "Tony Chan", and determines that there is no operation link in the current operating interface corresponding to the operation widget corresponding to the character string "Tony Chan", the terminal semantically comprehends the speech text "Tony Chan" input by the user, and finds that the character string "Tony Chan" corresponds to a person's name, and then generates a corresponding control command according to the semantical comprehension's result. As an example, the generated control command is to control the terminal to search the character string "Tony Chan" on the internet, then the terminal searches on the internet and the operating interface of the terminal displays internet searching results corresponding to the character string "Tony Chan".

Figure 5:
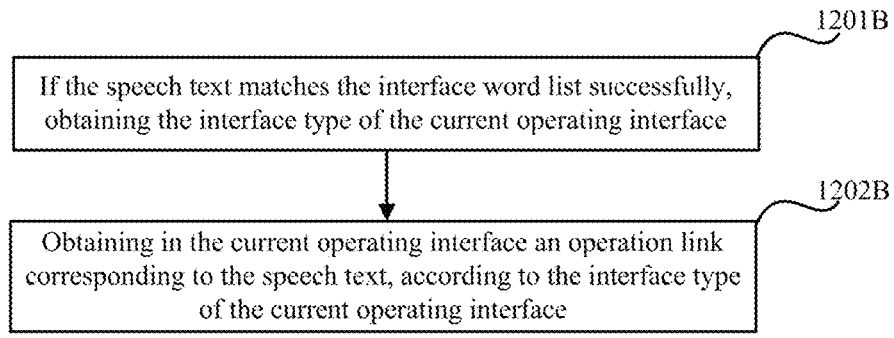
FIG. 5 is another schematic execution flow chart of Operation 120 according to embodiments of the disclosure.

In another aspect, in a case that the speech text corresponding to the voice data input by the user matches the interface word list corresponding to the current operating interface successfully, the terminal could also use the method below to obtain in the current operating interface an operation link corresponding to the speech text input by the user, as illustrated in FIG. 5.

Operation 1201B: if the speech text matches the interface word list successfully, obtaining an interface type of the current operating interface.

Operation 1202B: obtaining in the current operating interface an operation link corresponding to the speech text, according to the interface type of the current operating interface.

In at least one embodiment, if the speech text corresponding to the voice data input by the user matches the interface word list corresponding to the operating interface successfully, then the interface type corresponding to the current operating interface is further determined, where the interface type of the current operating interface include main interface type(s) and sub interface type(s). Take smart TV as an example, the main interface types of a smart TV include but are not limited to video application homepage, music application homepage, shopping application homepage, game application homepage, education application homepage, and search application homepage. The sub interface types include fixed interface types possessed by the service(s) corresponding to the main interface types. For example, the fixed interface types possessed by the video service corresponding to the video application homepage include but are not limited to video classification interface, video special area interface, video detail interface and video play interface, and the fixed interface types possessed by the shopping service corresponding to the shopping application homepage include but are not limited to products classification interface, products special area interface, products detail interface and products order placement interface.

For example, after the speech text corresponding to the voice data input by the user is "American Dreams in China" has matched successfully the character string "American Dreams in China" in the interface word list corresponding to the operating interface of FIG. 3, the terminal obtains the interface type of the current operating interface illustrated by FIG. 3, which is a video detail interface.

In at least one embodiment, after having obtained the interface type of the current operating interface, the terminal obtains the interface word template corresponding to the interface type, where the interface word template include one or more fixed interface words and one or more preset interface words corresponding to the interface type and a fixed interface word is a fixed interface word commonly used in service interfaces corresponding to the interface type. Every fixed interface word corresponds to a fixed operation link. For example, in the video detail interface illustrated in FIG. 3, the operation link corresponding to the fixed interface word "watch" is a playing link of the video source, and the operation link corresponding to the fixed interface word "favorite" is a putting into favorite link of the video source. As an example, fixed interface words of the video classification interface's interface word template include but are not limited to "sports", "finance and economics", "comic and animation", "variety", "documentary", and, fixed interface words of the video detail area interface's interface word template include but are not limited to "watch", "display", "favorite" and "more movies", fixed interface words of the video special area interface's interface word templet include but are not limited to "thriller", "comedy", "action" and "crime". Of course, the description herein is just an example, to which the fixed interface words according to embodiments of the disclosure are not limited.

It should be noted that, all the other interface words that are not fixed interface words in the current operating interface are preset interface words of the current operating interface. For example, the interface words corresponding to the current operating interface illustrated by FIG. 3 include: Bride Wars, Rating, 8.2, Genres, Fresh, Drama, Comedy, Romance, Youth, 2015, Director, Tony Chan, Cast, Angelababy, Yawen Zhu, Ni Ni, Xiao Chen, This Video is from Aiqiyi, Purchase Lychee VIP to enjoy watching the video in full length 1080P, The copyright of the video is from Aiqiyi, Ma Li and He Jing have been close friends since childhood and as little girls both of them attended a romantic wedding in a beautiful hotel and since then they have been dreaming about holding their own wedding ceremonies in the same hotel, WATCH, MORE MOVIES, FAVORITE, Let's Get Married, American Dreams in China, Only You, The Longest Night in Shanghai, of the Beautiful President (or Personal Bodyguard of the Beautiful President), Women Who Know How to Flirt are the (or Women Who Know How to Flirt Are the Luckiest), Whoever, Fight against Landlords, Valentine's Day Fate (Valentine's Day Fate Creation), where WATCH, MORE MOVIES and FAVORITE are the fixed interface words corresponding to the current operating interface and the others are the preset interface words corresponding to the current operating interface.

In at least one embodiment, if it is a fixed interface word in the current operating interface that the speech text input by the user matches, then obtain an operation link corresponding to the fixed interface word according to the interface type and the interface word templet of the current operating interface. For example, the speech text "watch" corresponding to the voice data input by the user matches successfully with the fixed interface word "watch" corresponding to the operating interface in FIG. 3, then obtain a playing link of the video source as the operation link corresponding to the fixed interface word "watch", which means that the operation link corresponding to the speech text "watch" input by the user is a playing link of the movie "Bride Wars".

In at least one embodiment, if it is a preset interface word in the current operating interface that the speech text input by the user matches, then obtain in the current interface an operation widget corresponding to the preset interface word, and determine whether or not there is an operation link in the current interface corresponding to the operation widget. If there is an operation link in the current operating interface corresponding to the operation widget, then obtain the operation link corresponding to the operation widget, and if there is no operation link in the current operating interface corresponding to the operation widget, then semantically comprehend the speech text corresponding to the voice data input by the user. This process has been described in detail in the above descriptions, so a repeated description thereof will be omitted here.

Operation 130: performing the operation according to the operation link.

In at least one embodiment, after having obtained the operation link corresponding to the operation widget which corresponds to the speech text input by the user, the terminal performs the operation corresponding to the operation link. It should be noted that, after having obtained the operation link corresponding to the operation widget which corresponds to the speech text input by the user, the terminal could perform the operation corresponding to the operation link, without the user performing a click operation on the operation widget, which increases the voice control response rate of the terminal.

For example, the current operating interface is illustrated by FIG. 3, the speech text corresponding to the voice data input by the user is "watch", and the operation link in the current operating interface corresponding to the character string "watch", obtained by the terminal, is to play the movie "Bride Wars", then the terminal plays the movie "Bride Wars", i.e., the operating interface of the terminal displays the playing interface of the movie "Bride Wars".

For example, the current operating interface is illustrated by FIG. 3, the speech text corresponding to the voice data input by the user is "American Dreams in China", and the operation link in the current operating interface corresponding to the character string "American Dreams in China", obtained by the terminal, is to display a webpage which introduces the movie "American Dreams in China" in detail, then the terminal displays the webpage which introduces the movie "American Dreams in China" in detail, i.e., the operating interface of the terminal displays the webpage which introduces the movie "American Dreams in China" in detail.

A speech text input by a user is matched with an interface word list corresponding to current operating interface. If it is determined that the match is successful, obtain an operation link in the current operation interface corresponding to the speech text and perform corresponding operations according to the operation link to realize the user's voice control of the terminal. The voice control method according to embodiments of the disclosure could realize voice control of a terminal without semantic comprehension of speech text input by a user or any click operations performed on an operation widget corresponding to the speech text input by the user, which simplifies voice control process of the terminal, increases voice control response rate and accuracy of the terminal and improves user experience of the terminal.

In practical use, the user could input any voice data and the terminal could use the voice input module to receive any voice data input by the user, because the recognition accuracy of the voice input module is relatively low, the voice data input by the user may not be easily matched with the interface word list of the current operating interface. To further improve the accuracy and user experience of voice control of the terminal, another voice control method according to embodiments of the disclosure is illustrated in FIG. 4.

Figure 6:
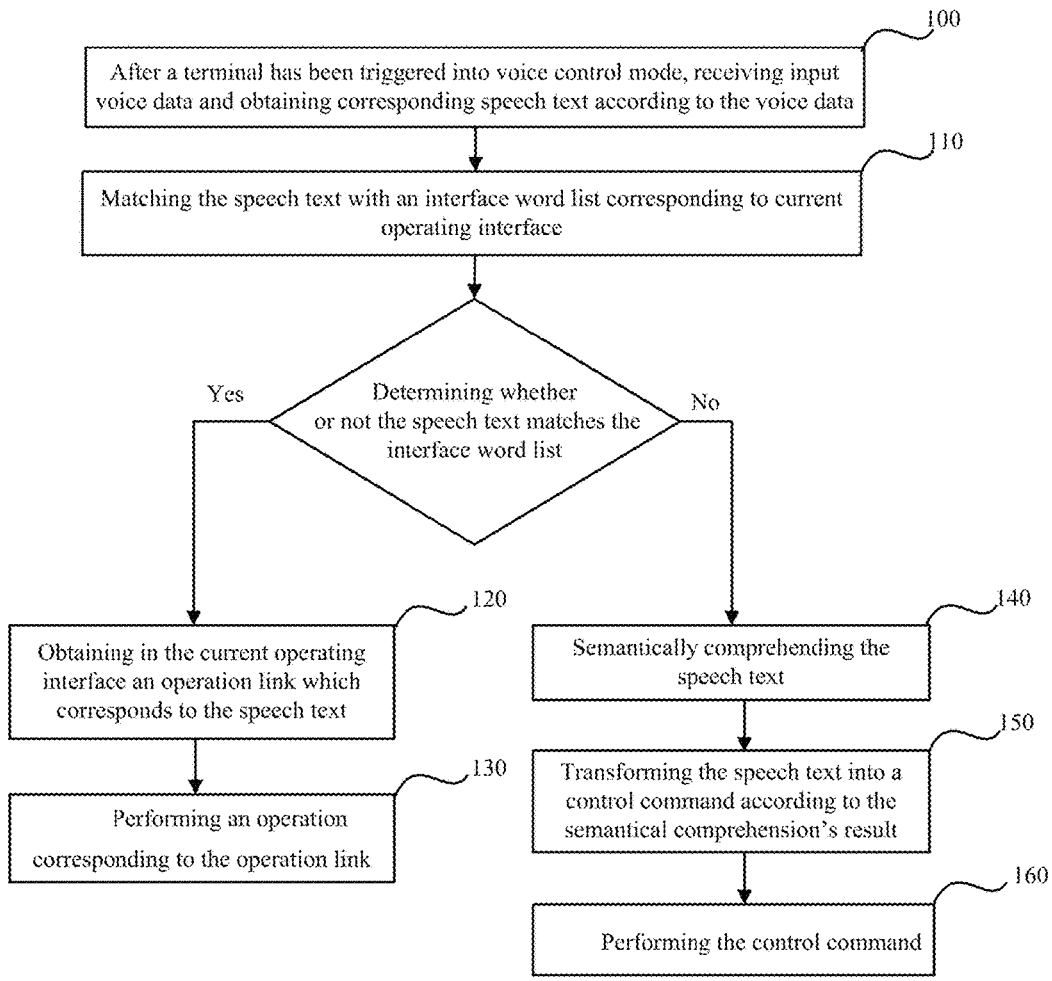
FIG. 6 is a schematic flow chart of another voice control method according to some embodiments of the disclosure.

As illustrated in FIG. 6, after Operation 110 the method further includes:

Operation 140: semantically comprehending the speech text.

Operation 150: transforming the speech text into a control command according to the semantical comprehension's result.

Operation 160: performing the control command.

In at least one embodiment, if it is determined that the speech text corresponding to the voice data input by the user doesn't match the interface word list corresponding to the current operating interface, then semantically comprehend the speech text input by the user, locate a service according to the semantical comprehension's result, generate a control command which corresponds to the execution of a corresponding service according to the located service, and then perform the generated control command. In the voice control method according to embodiments of the disclosure, the specific performing process of Operation 140, Operation 150 and Operation 160 is as same as the prior art and thus a repeated description will be omitted herein. In at least one embodiments, those skilled in the art could refer to the prior art.

For example, in a case that the speech text corresponding to the voice data input by the user is "watch American Dreams in China", the terminal compares the character string "watch American Dreams in China" as a whole with character strings in the interface word list corresponding to the operating interface in FIG. 3, and finds that there are the character strings "watch" and "American Dreams in China" in the interface word list corresponding to the operating interface in FIG. 3, but no character string "watch American Dreams in China", then the match fails. The terminal then semantically comprehends the speech text "watch American Dreams in China" input by the user, and the semantical comprehension's result is that the user wants to play the movie "American Dreams in China". The terminal then generate a corresponding control command according to the semantical comprehension's result which is: play the movie "American Dreams in China". Then the terminal performs the control command which is to play the movie "American Dreams in China" and the display interface of the terminal displays the play interface of the movie "American Dreams in China".

Figure 7:
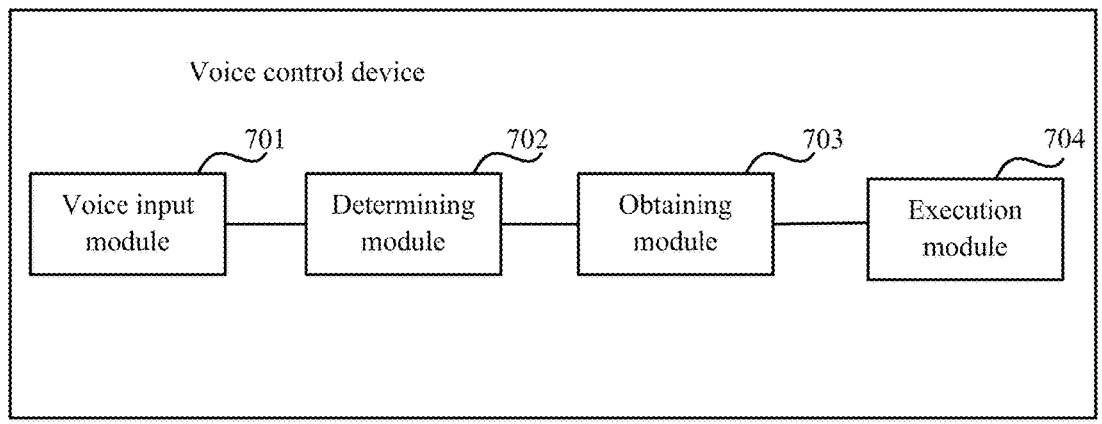
FIG. 7 is a structural schematic diagram of a voice control device according to embodiments of the disclosure.

Embodiments of the disclosure also provide a voice control device, which could be set in terminals such as a smart phone, a smart TV, a tablet PC and a laptop. The voice control device provided by embodiments of the disclosure, as illustrated in FIG. 7, includes:

a voice input module 701, adapted to receive voice data input by a user and to obtain corresponding speech text according to the received voice data, after the terminal has been triggered into voice control mode;

a determining module 702, adapted to determine whether or not the speech text received by the voice input module 701 matches an interface word list corresponding to current operating interface;

an obtaining module 703, adapted to obtain the interface word list corresponding to the current operating interface, and to obtain in the current operating interface an operation link corresponding to the speech text received by the voice input module 701, if the determining module 702 determines that the speech text received by the voice input module 701 matches successfully with the interface word list corresponding to the current operating interface; and an execution module 704, adapted to execute the operation link obtained by the obtaining module 703 in the current operating interface which corresponds to the speech text received by the voice input module 701.

In at least one embodiment, if the judging module 702 determines the speech text received by the voice input module 701 matches successfully with the interface word list corresponding to the current operating interface, the obtaining module 703 obtains an operating widget in the current operating interface corresponding to the speech text received by the voice input module 701, then the determining module 702 determines whether or not the operating widget has a corresponding operation link in the current operating interface, and if the operation widget has a corresponding operation link in the current operating interface, the obtaining module 703 obtains the operation link corresponding to the operation widget.

In another aspect, in at least one embodiment, if the determining module 702 determines that the speech text received by the voice input module 701 matches successfully with the interface word list corresponding to the current operating interface, the obtaining module 703 obtains the interface type of the current operating interface, obtains an interface word template corresponding to the interface type according to the interface type of the operating interface, and then obtains an operation link in the current operating interface which corresponds to the speech text received by the voice input module 701.

The voice control device provided by embodiments of the disclosure is adapted to perform the operations of the above voice control method, a repeated description will be omitted here.

In the voice control device provided by embodiments of the disclosure, a determining module 702 matches a user input speech text received by a voice input module 701 with an interface word list corresponding to the current operating interface, and if the match is successful, an obtaining module 703 obtains in the current operating interface an operation link corresponding to the speech text, and then an execution module 704 performs an corresponding operation according to the operation link, to realize the user's voice control of a terminal. The voice control device provided by embodiments of the disclosure doesn't need semantical comprehension of the user input speech text, which simplifies the voice control process of the terminal, further increases the voice control response rate and accuracy of the terminal, and improves user experience of the terminal.

Figure 8:
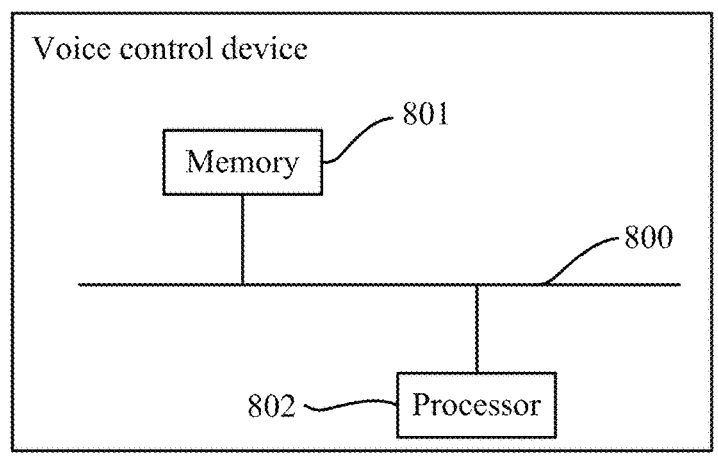
FIG. 8 is a structural schematic diagram of another voice control device according to embodiments of the disclosure.

Based on the same technological conception, the disclosure also provides a voice control device, as illustrated in FIG. 8, and the device includes a memory 801 and a processor 802, where the memory 801 and the processor 802 could be connected via bus 800, or via a specialized connection wire. As an example, they are connected via bus 800 in FIG. 8. The memory 801 is adapted to store instructions and the processor 802 is adapted to execute instructions stored in the memory 801 so that when executing the instructions it could perform the following operations:

after a terminal has been triggered into voice control mode, receiving input voice data and obtaining corresponding speech text according to the voice data;

matching the speech text with an interface word list corresponding to current operating interface, where the interface word list includes text information of the current operating interface;

in response to determining that the speech text matches an interface word list successfully, obtaining in the current operating interface an operation link which corresponds to the speech text; and performing an operation corresponding to the operation link.

In at least one embodiment, in response to determining that the speech text matches the interface word list successfully, obtaining in the current operating interface an operation link which corresponds to the speech text, includes:

in response to determining that the speech text matches the interface word list successfully, obtaining in the current operating interface an operation widget corresponding to the speech text;

determining whether or not the operation widget has a corresponding operation link in the current operating interface;

in response to determining that the operation widget has a corresponding operation link in the current operating interface, obtaining the operation link.

In at least one embodiment, after determining whether or not the operation widget has a corresponding operation link in the current operating interface, the instructions are executed by the processor 802 to enable the processor to further perform:

In response to determining that the operation widget doesn't have a corresponding operation link in the current operating interface, semantically comprehending the speech text;

transforming the speech text into a voice control command according to the semantical comprehension's result; and performing the voice control command.

In at least one embodiment, said in response to determining that the speech text matches the interface word list successfully, obtaining in the current operating interface the operation link which corresponds to the speech text, includes:

in response to determining that the speech text matches the interface word list successfully, obtaining an interface type of the current operating interface, where the interface type includes main interface type and sub interface type;

obtaining in the current operating interface an operation link corresponding to the speech text according to the interface type of the current operating interface.

In at least one embodiment, said obtaining in the current operating interface an operation link corresponding to the speech text according to the interface type of the current operating interface, includes:

obtaining an interface word template corresponding to the interface type of the current operating interface, where the interface word template includes one or more fixed interface words and one or more preset interface words; and if the speech text is a fixed interface word, obtaining an operation link corresponding to the fixed interface word.

In at least one embodiment, after obtaining an interface word template corresponding to the interface type of the current operating interface, the instructions are executed by the processor 802 to enable the processor to further perform:

if the speech text is a preset interface word, obtaining in the current operating interface an operation widget corresponding to the speech text;

determining whether or not the operation widget has a corresponding operation link in the current operating interface; and in response to determining that the operation widget has a corresponding operation link in the current operating interface, obtaining the operation link.

In at least one embodiment, after matching the speech text with an interface word list corresponding to the current operating interface, the instructions are executed by the processor 802 to enable the processor to further perform:

in response to determining that the speech text doesn't match the interface word list, semantically comprehending the speech text;

transforming the speech text into a voice control command according to the semantical comprehension's result; and performing the voice control command.

Embodiments of the disclosure also provide a terminal, where the terminal includes but is not limited to a smart phone, a smart TV, a tablet PC or a laptop, includes the abovementioned voice control device, and is adapted to perform the operations of the abovementioned voice control method, which would not be discussed herein anymore.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the disclosure have been described, those skilled in the art benefiting from the underlying inventive concept can make additional modifications and variations to these embodiments. Therefore the appended claims are intended to be construed as encompassing the embodiments and all the modifications and variations coming into the scope of the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A voice control method, the method comprising:
   after a terminal has been triggered into a voice control mode, receiving input voice data and obtaining corresponding speech text according to the voice data;
   matching the speech text with an interface word list corresponding to a current operating interface, wherein the interface word list includes text information of the current operating interface;
   in response to determining that the speech text matches the interface word list successfully, obtaining in the current operating interface an operation widget corresponding to the speech text;
   determining whether or not the operation widget has a corresponding operation link in the current operating interface;
   in response to determining that the operation widget has the corresponding operation link in the current operating interface, obtaining the operation link; and
   performing an operation corresponding to the operation link;

wherein after determining whether or not the operation widget has the corresponding operation link in the current operating interface, the method further comprises:
   in response to determining that the operation widget does not have the corresponding operation link in the current operating interface, semantically comprehending the speech text;
   transforming the speech text into a voice control command according to the semantical comprehension's result; and
   performing the voice control command.

2. The method according to claim 1, wherein after matching the speech text with the interface word list corresponding to the current operating interface, the method further comprises:
   in response to determining that the speech text does not match the interface word list, semantically comprehending the speech text;
   transforming the speech text into a voice control command according to the semantical comprehension's result; and
   performing the voice control command.

3. A terminal comprising:
   at least one processor; and
   a non-volatile readable storage medium storing therein instructions executable by the at least one processor, wherein the instructions are executed by the at least one processor to enable the at least one processor to perform the method according to claim 1.

4. The terminal according to claim 3, wherein after determining whether or not the operation widget has the corresponding operation link in the current operating interface, the instructions are executed by the at least one processor to enable the at least one processor to further perform operations:
   in response to determining that the operation widget does not have the corresponding operation link in the current operating interface, semantically comprehending the speech text;
   transforming the speech text into a voice control command according to the semantical comprehension's result; and
   performing the voice control command.

5. The terminal according to claim 3, wherein after matching the speech text with the interface word list corresponding to the current operating interface, the instructions are executed by the at least one processor to enable the at least one processor to further perform operations:
   in response to determining that the speech text does not match the interface word list, semantically comprehending the speech text;
   transforming the speech text into a voice control command according to the semantical comprehension's result; and
   performing the voice control command.

6. A voice control method, the method comprising:
   after a terminal has been triggered into a voice control mode, receiving input voice data and obtaining corresponding speech text according to the voice data;
   matching the speech text with an interface word list corresponding to a current operating interface, wherein the interface word list includes text information of the current operating interface;
   in response to determining that the speech text matches the interface word list successfully, obtaining an interface type of the current operating interface, wherein the interface type includes a main interface type and a sub interface type;

obtaining in the current operating interface the operation link corresponding to the speech text according to the interface type of the current operating interface; and performing an operation corresponding to the operation link.

7. The method according to claim 6, wherein obtaining in the current operating interface the operation link corresponding to the speech text according to the interface type of the current operating interface, comprises:

obtaining an interface word templet corresponding to the interface type of the current operating interface, wherein the interface word templet comprises one or more fixed interface words and one or more preset interface words; and if the speech text is a fixed interface word, obtaining an operation link corresponding to the fixed interface word.

8. The method according to claim 7, wherein after obtaining the interface word templet corresponding to the interface type of the current operating interface, the method further comprises:

if the speech text is a preset interface word, obtaining in the current operating interface an operation widget corresponding to the speech text;

determining whether or not the operation widget has a corresponding operation link in the current operating interface; and in response to determining that the operation widget has a corresponding operation link in the current operating interface, obtaining the operation link.

9. A terminal, comprising:

at least one processor; and a non-volatile readable storage medium storing therein instructions executable by the at least one processor, wherein the instructions are executed by the at least one processor to enable the at least one processor to perform the method according to claim 6.

10. The terminal according to claim 9, wherein the operation of obtaining in the current operating interface the operation link corresponding to the speech text according to the interface type of the current operating interface comprises:

obtaining an interface word templet corresponding to the interface type of the current operating interface, wherein the interface word templet comprises one or more fixed interface words and one or more preset interface words; and if the speech text is a fixed interface word, obtaining an operation link corresponding to the fixed interface word.

11. The terminal according to claim 10, wherein after obtaining the interface word templet corresponding to the interface type of the current operating interface, the instructions are executed by the at least one processor to enable the at least one processor to further perform operations:

if the speech text is a preset interface word, obtaining in the current operating interface an operation widget corresponding to the speech text;

determining whether or not the operation widget has a corresponding operation link in the current operating interface; and in response to determining that the operation widget has a corresponding operation link in the current operating interface, obtaining the operation link.

12. The terminal according to claim 9, wherein after matching the speech text with the interface word list corresponding to the current operating interface, the instructions are executed by the at least one processor to enable the at least one processor to further perform operations:

in response to determining that the speech text does not match the interface word list, semantically comprehending the speech text;

transforming the speech text into a voice control command according to the semantical comprehension's result; and performing the voice control command.

13. The method according to claim 6, wherein after matching the speech text with the interface word list corresponding to the current operating interface, the method further comprises:

in response to determining that the speech text does not match the interface word list, semantically comprehending the speech text;

transforming the speech text into a voice control command according to the semantical comprehension's result; and performing the voice control command.

* * * * *